(12) United States Patent
Sato

(10) Patent No.: US 6,500,065 B1
(45) Date of Patent: Dec. 31, 2002

(54) IMAGE DISPLAYING METHOD, DEVICE, STORAGE MEDIUM, AND GAME MACHINE FOR BASKETBALL BASED GAME WITH VARIABLE SHOT SUCCESS FEATURE

(75) Inventor: Masahiro Sato, Tokyo (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/505,199

(22) Filed: Feb. 16, 2000

(30) Foreign Application Priority Data

Feb. 16, 1999 (JP) .......................................... 11-037536

(51) Int. Cl.7 ................................................ A63F 13/00
(52) U.S. Cl. ............................... 463/4; 463/43; 463/30; 463/2
(58) Field of Search ...................... 463/3–4, 23, 30–31, 463/32–33; 273/317, 108.1–108.4, 445, 459–461

(56) References Cited

U.S. PATENT DOCUMENTS

| | | | | |
|---|---|---|---|---|
| 4,752,069 A | * | 6/1988 | Okada | .......................... 463/23 |
| 5,601,487 A | * | 2/1997 | Oshima et al. | ................. 463/4 |
| 6,217,444 B1 | * | 4/2001 | Kataoka et al. | ................. 463/3 |

OTHER PUBLICATIONS

NBA Live 98. Released Nov. 11, 1997. Moby Games, Retrieved from the Internet <http://www.mobygames.com/game/sheet/review_game/gameId,2314/.*

* cited by examiner

*Primary Examiner*—Mark Sager
*Assistant Examiner*—Aaron Capron
(74) *Attorney, Agent, or Firm*—Sughrue Mion, PLLC

(57) ABSTRACT

In a game device for use in displaying an image on a display device to play a video basketball game in response to an operation of a user, a shot image which takes a shot at a goal by a character is displayed on the display device while manipulation timing of the user is monitored to determine whether the shot succeeds or not. On the display device, a gauge is displayed which has a shot success zone and a movable cursor and which is used to determine whether the movable cursor is placed within the shot success zone at the manipulation timing. The gauge is helpful to determine success or failure of the shot.

19 Claims, 11 Drawing Sheets

IMAGE DISPLAYING METHOD, DEVICE, STORAGE MEDIUM, AND GAME MACHINE FOR BASKETBALL BASED GAME WITH VARIABLE SHOT SUCCESS FEATURE

BACKGROUND OF THE INVENTION

This invention relates to a method and a device for use in a sports game to display an image, and also to a computer-readable storage medium, and a game machine for playing the sports game.

Conventionally, a wide variety of computer games or video games, such as a simulation game, a role playing game, a fighting game, a puzzle game, and the like have been proposed and become popular in the world. In addition, various sports games, such as a golf game, a baseball game, a football game, a basketball game, a horse racing game, have been also sold as computer sports games and are very popular among users.

In such sports games, it often happens that the computer sports games are executed in accordance with rules which are similar to those of real sports games. This means that the computer sports games simulate the corresponding real sports games. In this event, it is possible to enhance reality of the computer sports games by determining or varying ability of each character or team in each of the computer sports games in consideration of actual records of real players and real teams. Such computer sports games have the advantage of attracting persons who are not interested in the other types of computer games and who actually enjoy the real sports games, because the computer sports games are similar to the corresponding real sports games.

Among the real sports games, there are a lot of sports games which execute exhibition matches and the like after completion of the real sports games or during an intermission, such as a half time. In general, such exhibition matches are not often limited by normal rules of the real sports games and, therefore, enable unusual and striking performance of real players which can not be seen in usual real sports games by spectators. Accordingly, such exhibition matches are favorites with the spectators or audiences.

Herein, it is to be noted that the exhibition matches are often executed by neglecting the normal rules, as mentioned above, and are not constantly performed. Therefore, it is difficult to create computer games of the exhibition matches in a conventional manner of simulating the real sports games.

For example, the basketball is one of the most popular sports in U.S.A., as well known, and, in particular, the NBA (National Basketball Association) has a great number of fans in the world. In the NBA, three-point shootout has been performed as the exhibition match by way of entertainment during all star game while a dunk contest was also performed as the exhibition match in the past. Herein, the dunk contest is for contesting, among basketball players, dunk shots which are thrown downward through a basket or goal, with one or two hands to compete with one another in terms of artistry, excitement, and a degree of difficulty. On the other hand, the three-point shootout is for contesting the number of successful three-point shots which are thrown from outside of a three-point line drawn on a basket court.

Now, it is to be noted that the artistry, the excitement, and the degree of difficulty are visibly evaluated and scored in the dunk contest. However, it is difficult to realize the dunk contest in the form of a computer sports game. In fact, nothing can be exemplified as a computer sports game of the dunk contest, because a visible evaluation basis of each evaluator is individually different from one another.

As mentioned before, a competition is made in the three-point shootout to contest a successful rate of the three-point shots thrown toward a goal or a basket from a plurality of locations determined outside of the three-point line.

In order to realize such three-point shootout in the form of a computer sports game, a technique is often adopted such that a player in the computer sports game is displayed on a display device together with a basketball and a basket and throws the basketball towards the basket in a displayed image. In this event, the basketball thrown by the player in the computer sports game is guided under a manipulation of each user. This shows that the three-point shootout which is realized as the computer sports game and which may be referred to as three-point shootout game simulates the real three-point shootout.

On playing such a simulated three-point shootout game, a user must quickly and instantaneously manipulate an analog stick, such as a joy stick, so that the basketball enters into the basket on the displayed image. Thus, the three-point shootout game as the computer sports game simulates real three-point shootout performed in the NBA.

However, it is difficult for each user to quickly and instantaneously manipulate the analog stick. This shows that each user should become proficient in the manipulation of the analog stick so as to enter the basketball into the basket and to make a shot succeed in the three-point shootout game.

In consequence, most users become boring in the three-point shootout game because it takes a long time to master the manipulation of the analog stick.

Inasmuch as the real three-point shot actually needs a difficult technique, such a method of making the three-point shootout game by simulating the real three-point shot can neither attract users' interest nor acquire a lot of users.

In addition, the exhibition matches, such as the three-point shootout, are actually performed as subordinate matches in addition to the primary basketball. Therefore, when the three-point shootout is realized as the three-point shootout game in the computer sports games, it is preferable that the three-point shootout game itself is subordinately added as a mini-game to a primary basketball game.

SUMMARY OF THE INVENTION

It is an object of this invention to provide an image display method and a game device each of which can enjoy an exciting and thrilling exhibition game added to a primary computer sports game, by carrying out a simple manipulation.

It is another object of this invention to provide an image display method and the game device each of which can attract interest of a lot of people and which can enjoy an exciting exhibition match.

It is still another object of this invention to provide an image display method and a game device each of which can perform a three-point shootout game within the exhibition matches in a basketball.

It is yet another object of this invention to provide a computer readable storage medium which stores a three-point shootout game which is simple in manipulation and which is thrilling and exciting.

It is another object of this invention to provide a computer readable storage medium of the type described, which stores the three-point shootout game as a mini-game in addition to a primary basketball game.

According to an aspect of this invention, a method is for use in displaying an image on a display device to play a game of basketball in the form of a video basketball game in response to an operation of a video game player or user and comprises the steps of displaying, on the display device, a shot image of taking a shot at a goal by a character selected in the video basketball game, and monitoring operation timing of the video game player to determine whether the shot succeeds or not. The monitoring step comprises the steps of successively varying display situations with time on the display device, stopping the varying display situations in response to the operation of the video game player to select one of the varying display situations as a selected stable display situation, and judging whether or not the selected stable display situation is coincident with a specific display situation appearing at specific timing to determine success or failure of the shot.

According to another aspect of this invention, an image display device is for use in displaying an image on a display device to play a game of basketball in the form of a video basketball game in response to an operation of a video game player. The image display device comprises displaying means for displaying, on the display device, a shot image of taking a shot at a goal by a character selected in the video basketball game, and monitoring means for monitoring operation timing of the video game player to determine whether the shot succeeds or not.

According to still another aspect of this invention, a game machine or device is for use in playing a game of basketball in the form of a video basketball game in response to an operation of a video game player by the use of a display device. The game machine comprises display means for providing, on the display device, displays of a gauge which has a shot success zone and a movable cursor, together with a character which operates as a basketball player in the video basketball game and which takes a shot at a goal, cursor control means for moving the movable cursor in a direction of the shot success zone within the gauge to stop the cursor in response to operation timing of the video game player, and judging means for judging whether or not the cursor is stopped within the shot success zone, to detect success of the shot when the cursor is stopped within the shot success zone and, otherwise, to detect failure of the shot.

According to another aspect of this invention, a computer-readable storage medium is for storing a program which plays a game of basketball in the form of a video basketball game in response to an operation of a video game player by the use of a display device. The program comprises the steps of displaying, on the display device, a shot image of taking a shot at a goal by a character selected in the video basketball game, and monitoring operation timing of the video game player to determine whether the shot succeeds or not. The video basketball game may be a three-point shootout game.

DESCRIPTION OF THE PREFERRED EMBODIMENTS

Figure 1:
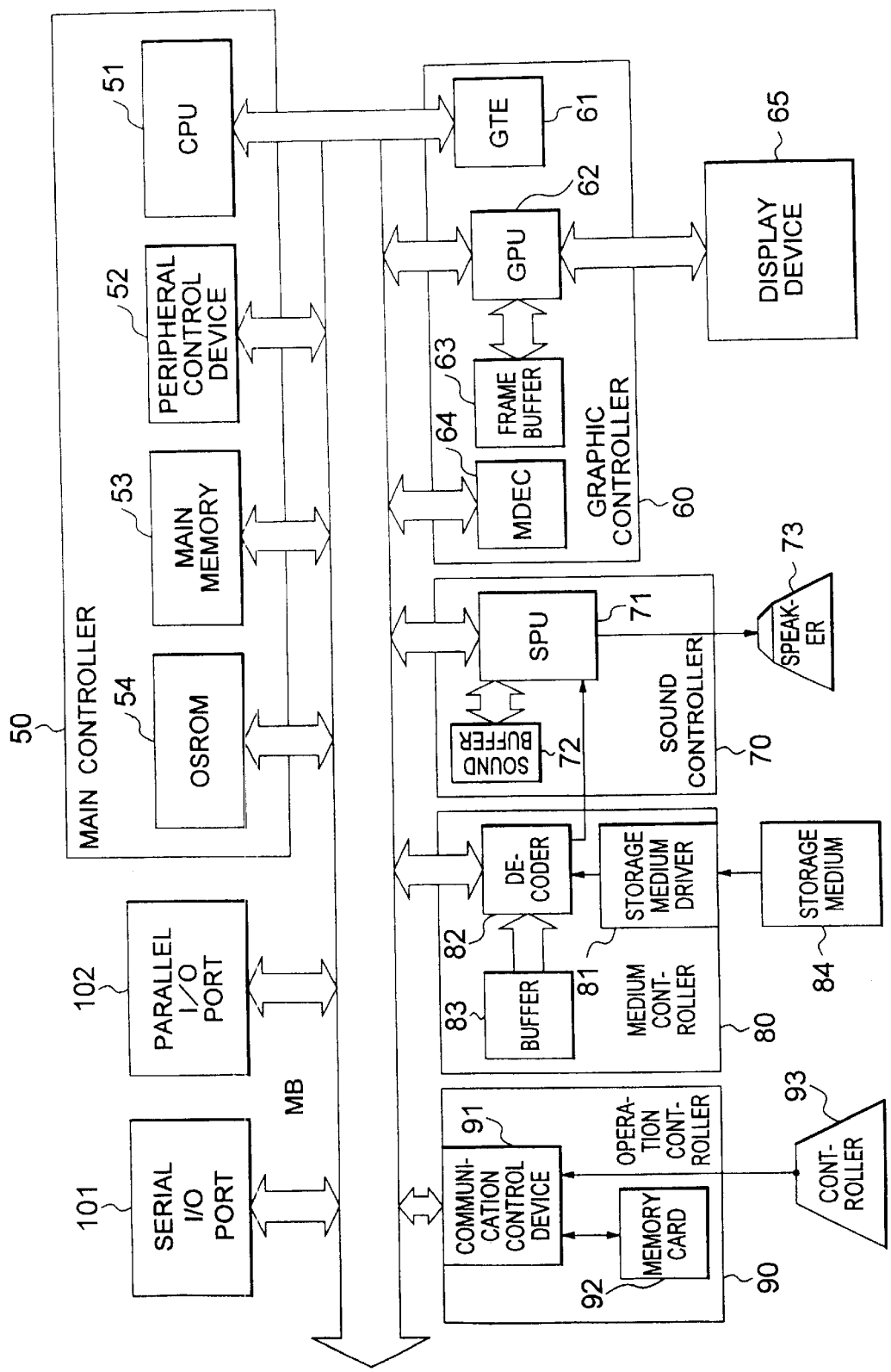
FIG. 1 is a block diagram of a game device to which this invention is applicable.

Referring to FIG. 1, description will be made about an example of a game device or machine to which this invention is applicable. Although a family use game device is exemplified as the game machine in FIG. 1, this invention can be applicable to a personal computer device, a graphic computer device, a business use game device, such as an arcade game machine.

Herein, it is to be noted that a program which executes a game according to this invention is stored in a computer-readable storage medium (will be simply called a storage medium hereinafter) which may be, for example, an optical disk, such as a CDROM and is read out of the storage medium in response to instructions issued by a video game player or a user when the storage medium is loaded in the game apparatus.

As shown in FIG. 1, the illustrated game apparatus has a main controller 50, a graphic controller 60, a sound controller 70, a medium controller 80, and an operation controller 90, all of which may be collectively referred to as a control unit. The illustrated control unit, namely, the controllers 50 to 90 are all connected to a main bus MB together with a serial I/O port 101 and a parallel I/O port 102. The illustrated serial I/O port 101 is used to communicate with other game devices and the like while the parallel I/O port 102 is used to be connected to any other peripheral devices. In addition, the main controller 50, the operation controller 90, and the medium controller 80 is operable to execute the game in response to a maneuver of the player and may be called a game controller also.

The illustrated main controller 50 has a central processing unit (CPU) 51, a peripheral device controller 52, a main memory 53, and an operating system (OS) ROM 54. More specifically, the peripheral device controller 52 in the main controller 50 executes interruption control, time control, memory control, direct memory access (DMA) transfer control, and so on. On the other hand, the main memory 53 is implemented, for example, by a RAM which has a memory capacity of two megabytes while the OSROM 54 is structured, for example, by an ROM which has a memory capacity of 512 kilobytes. The OSROM 54 is assumed to store an OS which is operable to control the main memory 53, the graphic controller 60, the sound controller 70.

In FIG. 1, the central processing unit (CPU) 51 may be a RISC (Reduced Instruction Set Computer) CPU and controls the remaining elements in accordance with the OS stored in the ROM 54. The illustrated CPU 51 has an instruction cache, a scratch pad memory and also administrates a real memory.

The graphic controller 60 is structured by a geometry transfer engine (GTE) 61, a graphic processing unit (GPU) 62, a frame buffer 63, and an expander (which may be called a motion decoder (MDEC) as will become clear later) 64. The GPU 62 of the graphic controller 60 is connected to a display device 65 which serves as a display controller which controls displayed images of the game.

The display device 65 may be, for example, a television monitor, in the usual family use computer game device or a computer display unit in the personal computer or a work station. In addition, the display device 65 may be a game display device in the business use game machine.

In the graphic controller 60, the geometry transfer engine (GTE) 61 is implemented by a co-processor for processing a coordinate conversion or the like while the graphic processing unit (GPU) 62 paints a picture in response to a paint instruction. Such a picture is displayed on the display device 65 in the form of a picture image. The picture image painted by the GPU 62 is stored in the frame buffer 63. In addition, the expander 64 carries out orthogonal transform, such as discrete cosine transform, and decodes a compressed and encoded image data signal into a motion picture. In this connection, the expander 64 may be referred to as the MDEC, as mentioned before.

Furthermore, the geometry transfer engine (GTE) 61 has a parallel calculation circuit for executing a plurality of calculations in parallel. Specifically, the GTE 61 cooperates with the CPU 61 and may be called a coprocessor for carrying out coordinate conversion in response to a calculation request sent from the CPU 51. In addition, the GTE 61 can also execute, at a high speed, an inner product between a tangential vector and an optical source vector together with a fixed point calculation related to a matrix and a vector.

The illustrated GTE 61 can carry out calculations of polygons of 150 millions per second to transform the coordinate when a triangle polygon is subjected to flat shading such that the single triangle polygon is painted in the same color. From this fact, it is readily understood that the illustrated GTE 61 is helpful to alleviate a burden imposed on the CPU 51 and can carry out high speed coordinate conversion. Herein, the term "polygon" means a minimum unit of a figure that is displayed as a three-dimensional object and takes a shape of a polygon, such as a triangle, a rectangle, or the like. The illustrated GTE 61 may be operable to execute the coordinate calculations in connection with the polygons, as will become clear as the description proceeds.

The graphic processing unit (GPU) 62 is operable in response to the paint instructions sent from the CPU 51 to paint each polygon. Practically, the illustrated GPU 62 can paint the polygons of 360,000 pieces per second and has two-dimensional address space for mapping a space of the frame buffer 63.

The frame buffer 63 is structured by a dual port RAM and can simultaneously execute write-in operation from the GPU 62 and the main memory 53 and readout operation on displaying. Practically, the frame buffer 63 has a memory capacity of, for example, 1 megabyte and may be specified by a matrix of picture elements of sixteen bits. The picture elements are arranged in rows of 1024 and in columns of 512. In the illustrated example, it is assumed that the frame buffer 63 has a display zone partitioned into a plurality of partial display zones and a non-display zone except the display zone. Each of the partial zones can be individually sent to the display device 65. On the other hand, the non-display zone has a color lookup table (CLUT) area and a texture area. The CLUT area serves to store a CLUT referenced by the GPU 62 on painting each polygon while the texture area serves to store textures or materials mapped into each polygon painted by the GPU 62. Moreover, the illustrated frame buffer 63 can carry out the DMA transfer to the main memory 53.

The MDEC 64 in the graphic controller 60 is operable under control of the CPU 51 to read an image data signal of a static image or a moving image out of the main memory 53 and to decode the image data signal to be stored into the main memory 53 again. Specifically, the MDEC 64 can execute inverse discrete cosine transform (IDCT) at a high speed and also can expand the image data signal which is compressed in accordance with the JPEG and the MPEG techniques and which is read out of the storage medium 84. The resultant image data signal is reproduced and is sent through the GPU 62 to the frame buffer 63. Such a reproduced image can be used as a background image of an image painted by the GPU 62.

The sound controller 70 has a sound processing unit (SPU) 71 for generating a musical sound, an imitation effective sound, or the like on the basis of the instructions sent from the CPU 51, a sound buffer 72 of, for example, 512 kilobytes for storing sound source data, sound data read out of the storage medium 84, and a speaker 73 which generates audible sounds and tones, such as the musical sound, sent from the SPU 71 and which serves as a sound output device.

In the illustrated example, the SPU 71 has a ADPCM function which can reproduce an audio data signal which is subjected to adaptive differential encoding (ADPCM) and which is specified by a differential code of four bits obtained by differentially encoding audio data signals of sixteen bits. In addition, the illustrated SPU 71 is also operable to reproduce the imitation effective sound from the sound source data signals stored in the sound buffer 72 and to reproduce a modulated sound data signal obtained by modulating the sound data signals stored in the sound buffer 72.

More specifically, the illustrated SPU 71 which is operable under control of the CPU 51 has twenty-four ADPCM sound sources automatically variable in accordance with operation parameters determined by coefficients, such as looping, time, and the like. In addition, the SPU 71 has an individual address space obtained by mapping the space of the sound buffer 72 and transfers the ADPCM data signals from the CPU 51 to the sound buffer 72 and reproduces them in accordance with key on/off information and/or modulation information.

The sound controller 70 which may be also called a sound system has the above-mentioned functions and is collectively used as a sampling sound source for generating the musical sound, the imitation effective sound, on the basis of the audio data signals stored in the sound buffer 72.

Next, the medium controller 80 has a storage medium driver 81, a decoder 82, and a buffer 83. Practically, the storage medium driver 81 is loaded with the storage medium 84, such as the CDROM, a hard disk, an optical disk, a flexible disk, a semiconductor memory, or the like. In the illustrated example, the CDROM is assumed to be used as the storage medium in the illustrated example. In this connection, the storage medium driver 81 may be formed by a CDROM driver and the decoder 82 may be formed by a CDROM driver.

The storage medium driver 81 is operable to reproduce the program, the data signals, and the like stored in the storage medium 84, namely, the CDROM while the decoder 82 is operable to decode the program, the data signals, and the like which include, for example, error correcting codes. The buffer 83 is implemented by an RAM with a memory capacity of, for example, 32 kilobytes and serves to temporarily store reproduced data signals from the storage medium driver 81.

The illustrated example can support a data format of CD-DA, CDROM-XA. The decoder 82 is operable as a part of the sound controller 70 because the audio data signals stored in the storage medium 84 are also reproduced.

The audio data signals stored in the storage medium 84 and reproduced by the storage medium driver 81 may be, for example, the ADPCM data signals (ADPCM data signals in CDROM XA) as mentioned above or PCM data signals obtained by analog-to-digital conversion of the audio signals.

The ADPCM data signals may be represented by differential signals of four bits obtained from the audio digital signals of sixteen bits and are read out of the storage medium 84 to be subjected to error correction and decoding by the decoder 82 and thereafter to be sent to the SPU 71. The SPU 71 carries out the digital-to-analog conversion of the readout audio signals to be supplied to the speaker 74.

On the other hand, when the audio data signals are recorded in the storage medium 84 in the form of the PCM data signals of sixteen bits, the PCM data signals are decoded by the decoder 82 into decoded audio signals to be sent to the speaker 73. At any rate, audio output signals of the decoder 82 is once delivered into the SPU 71 to be mixed with the output signals of the SPU 71 and to be finally sent to the speaker 73.

Further referring to FIG. 1, the operation controller 90 has the communication control device 91 and an additional memory 92, such as a memory card, coupled to the communication control device 91. The communication control device 91 controls communication between a controller 93 and the CPU 51 through the main bus MB. The controller 93 is manipulated by a player to input an instruction from the player. The additional memory 92 is used to memorize the input instructions from the controller 93 and a state of the game.

The illustrated controller 93 serves as an interface which transmits the player's intention to an application or game program. To this end, the controller 93 has, for example, sixteen operation keys of which the states are transmitted about sixty times per second to the communication control device 91 by the use of synchronization communication. The communication control device 91 transmits the states of the operation keys to the CPU 51 through the main bus MB. Practically, the illustrated game device has two connectors each of which is connected to the controller 93 and may have a multi-tap terminal which is connected to a multiple number of the controllers 93.

At any rate, the instructions from each player are given to the CPU 51 in response to the manipulation of the player while the CPU 51 carries out processing in accordance with the instructions under control of the game program executed in the game device.

When the game which is being executed is set or a score of the game is memorized at the end of the game or on the way, data signals in question are transmitted from the CPU 51 to the communication control device 91 and thereafter stored into the additional memory or memory card 92 through the communication control device 91. The memory card 92 is not directly connected to the main bus MB and can be detached from the game device with the power source kept on. Under the circumstances, it is readily understood that the data signals related to the game can be memorized into a plurality of the memory cards 92.

In the illustrated game device, a great amount of image data signals must be transferred at a high speed among the main memory 53, the GPU 62, the MDEC 64, and the decoder 82, when the program is read out of the storage medium 84 and images are displayed or pictures are painted.

For this purpose, the DMA transfer can be carried out in the illustrated game device to directly transfer data signals among the main memory 53, the GPU 62, the MDEC 64, the decoder 82 under control of the peripheral device controller 52. Inasmuch as such DMA transfer is carried out without using the CPU 51, it is possible to alleviate a burden of the CPU 51 and to also accomplish high speed data transfer.

Figure 2:
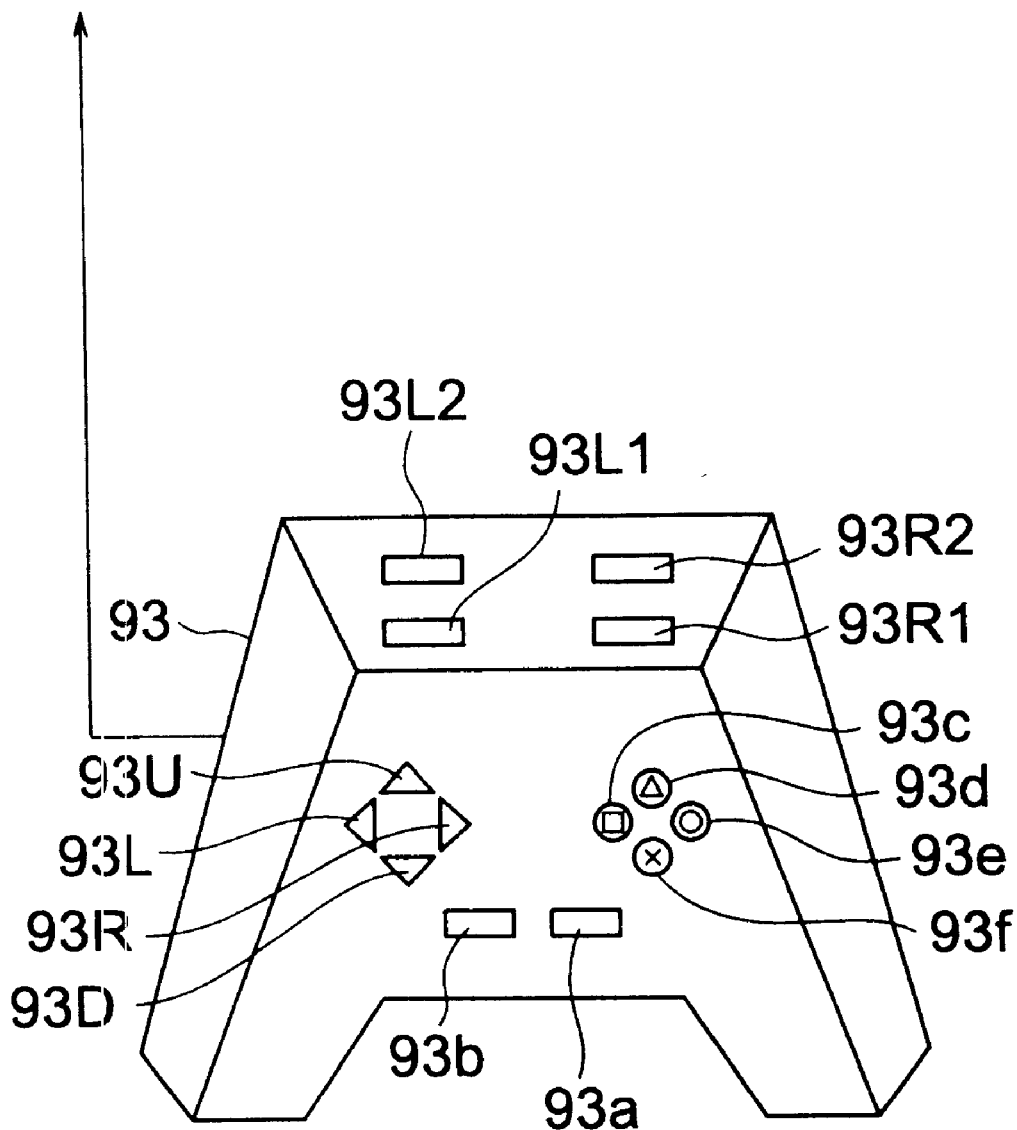
FIG. 2 is a schematic perspective view of a controller used in the game device illustrated in FIG. 1.

Referring to FIG. 2, detailed description will be made about a controller 93 which is used in the game device illustrated in FIG. 1. The illustrated controller 93 has a main body which is designed in an approximate trapezoidal configuration and which has a front surface, an upper side surface contiguous to the front surface, and left and right side surfaces contiguous to the front surface and the upper side surface. As illustrated in FIG. 2, the upper side surface is provided with a first left button 93L1, a second left button 93L2, a first right button 93R1, and a second right button 93R2. On the other hand, the front surface is provided on the left hand side region thereof with an upward key 93U, a downward key 93D, a leftward key 93L, and a rightward 93R. In addition, the center region of the front surface is provided with a start button 93a and a select button 93b each of which has a rectangular shape while the right hand side region of the front surface is provided with first through fourth buttons 93c, 93d, 93e, and 93f on which a square (□), a triangle (Δ), a circle (○), and a cross (×) are impressed. The above-mentioned keys and buttons are manipulated or operated by pushing down them by each user to supply the main body with control signal or commands which bring about a predetermined operation in the computer sports games, such as the three-point shootout game.

For example, the upward key 93U, the downward key 93D, the leftward key 93L, and the rightward key 93R are used in the three-point shootout game to produce commands which move a character displayed on the display device 65, upwards, downwards, leftward, and rightwards, respectively. They also serve to produce commands which move a cursor on a menu selection image or picture to select a mode in the three-point shootout game.

As will become clear later, the start button 93a serves to send a game start command to the CPU 51 in response to the manipulation of the user while the select button 93b serves to send a selection command to the CPU 51 in response to the manipulation of the user. In the illustrated example, predetermined functions which are determined in the three-point shootout game are assigned to the first through the fourth buttons 93c to 93f, the first and the second left buttons 93L1 and 93L2, and the first and the second right buttons 93R1 and 93R2.

In FIGS. 1 and 2, it is assumed that the storage medium 84 stores a basketball game including the three-point shootout game (will be described later in detail) and is mounted into the storage medium driver 81 and that the illustrated game device is put into an active state by supply of electric power. In this event, the CPU 51 accesses the OS ROM 54 and executes an operating system stored in the OS ROM 54. As a result of executing the operating system, the CPU 51 controls the graphic controller 60, the sound controller 70, and the like.

The start button 93a is pushed down by the user or player. More specifically, the CPU 51 initializes the game device as a whole and thereafter controls the medium controller 80.

In addition, the operating system gives an indication to the storage medium driver 81 to read the program out of the storage medium 84. Given the indication, the storage medium driver 81 carries out readout operation from the storage medium 84. In consequence, program data signals, such as image data signals, sound data signals, and program data signals, are sent from the storage medium 84 to the decoder 82. The decoder 82 carries out error correction of the data signals read out of the storage medium 84 to produce error corrected data signals. Among the error corrected data signals, the image data signals subjected to error correction are delivered from the decoder 82 to the MDEC 64 through the main bus (MB). In the illustrated example, the image data signals corrected are assumed to be divided into moving pictures and static pictures which are compressed by an intra-coding method based upon MPEG (Moving Picture Experts Group) and JPEG (Joint Picture Experts Group), respectively. In addition, such image data signals of the moving and the static pictures are further coded by a variable length coding (VLC) technique and are given to the MDEC 64 in the form of compressed image data signals. The MDEC 64 executes expansion processing of the compressed image data signals to supply expanded image data signals to the GPU 62. The GPU 62 writes the expanded image data signals into the frame buffer 63.

The frame buffer 63 has a display area and a non-display area. The display area of the frame buffer 63 is for storing data signals to be displayed on the display device 65 while the non-display area of the frame buffer 63 is for storing data signals which are not displayed on the display device 65. The illustrated non-display area serves to store data signals for defining skeletons, model data signals for defining polygons, animation data signals for moving the models, pattern data signals representative of contents of the animations, texture data signals, color pallet data signals, and so on. The texture data signals are specified by two dimensional image data signals representative of textures while the color pallet data signals are indicative of colors of textures and the like.

In the illustrated example, the expanded image data signals are stored in the non-display area of the frame buffer 63.

In addition, the expansion processing executed in the frame buffer 63 includes decoding processing of the variable length code (VLC), quantizing processing, IDCT (Inverse Discrete Cosine Transform) processing, and reproducing processing of intra-coded codes.

Turning back to FIG. 1, the decoder 82 is given, together with the image data signals, the sound data signals coded by ADCM, or the like, as mentioned before. The sound data signals are subjected to error correction by the decoder 82 and are supplied to the main memory 53 or the sound buffer 72 to be stored therein. In addition, the program data signals subjected to error correction by the decoder 82 are sent to the main memory 53 to be stored therein.

Thereafter, the CPU 51 advances the three-point shootout game in accordance with the game program data signals stored in the main memory 53 and the command data signals given from the controller 93 by the manipulation of the user. Briefly, it may be said that the CPU 51 executes control operation of the image and the sound on the basis of the commands given from the controller 93.

On controlling the image processing, the CPU 51 is supplied with pattern data signals corresponding to animations of characters and executes calculations of each skeleton coordinate, each apex coordinate of polygons, and three-dimensional coordinate data signals. In addition, the CPU 51 supplies the GPU 62 with the three-dimensional coordinate data signals calculated and observing point data signals related to the polygons. Moreover, the CPU 51 also issues paint instructions, address data signals, and brightness data signals concerned with the display area of frame buffer 62.

On controlling the sound processing, the CPU 51 supplies the SPU 71 with sound output commands and an indication of volumes. Furthermore, the CPU 51 executes calculations in response to the manipulation of the controller 93 on controlling an internal process.

As a result, displaying the image and generating a musical sound and an imitation effective sound are controlled by the graphic controller 60, the sound controller 70, and so on under control of the CPU 51 in response to the manipulation of the user.

Now, description will be made about the basketball game which uses the image display method according to this invention.

Figure 3:
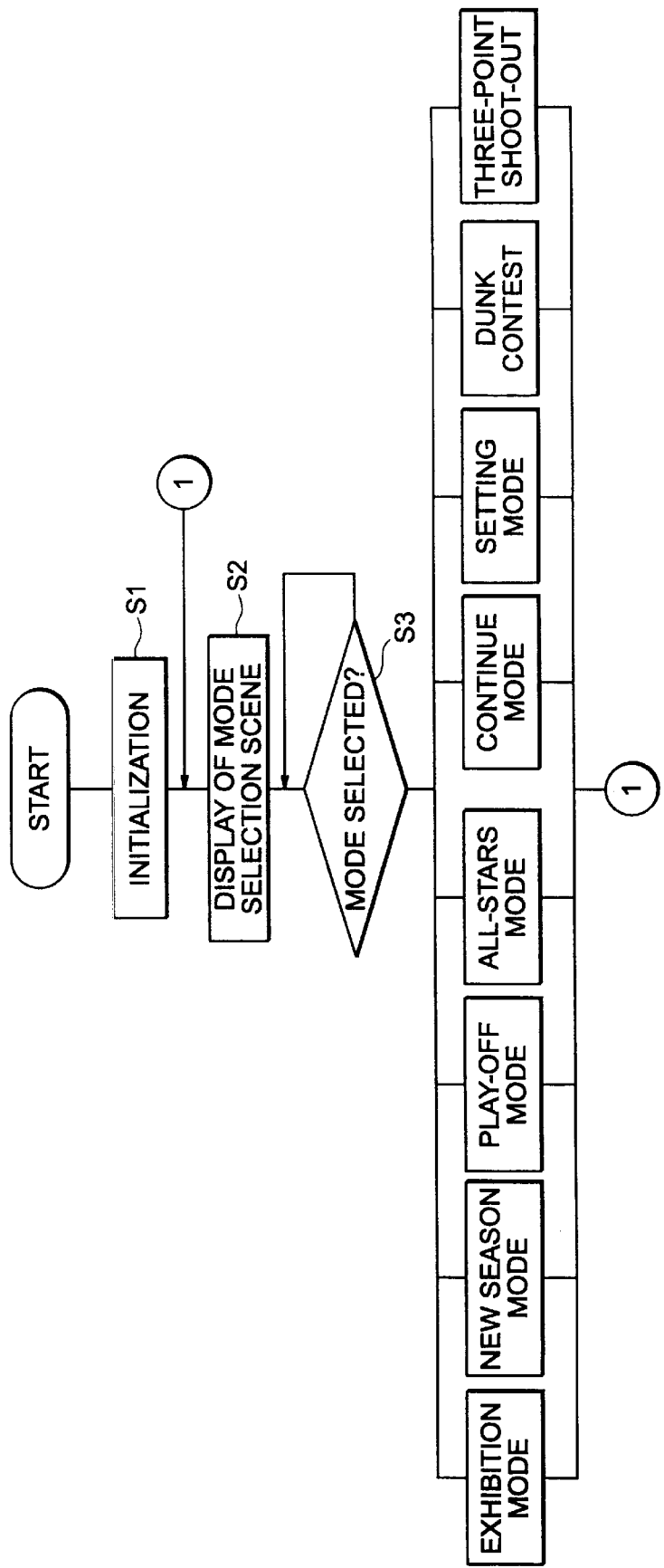
FIG. 3 is a flow chart for use in describing a whole of a basketball game.
Figure 4:
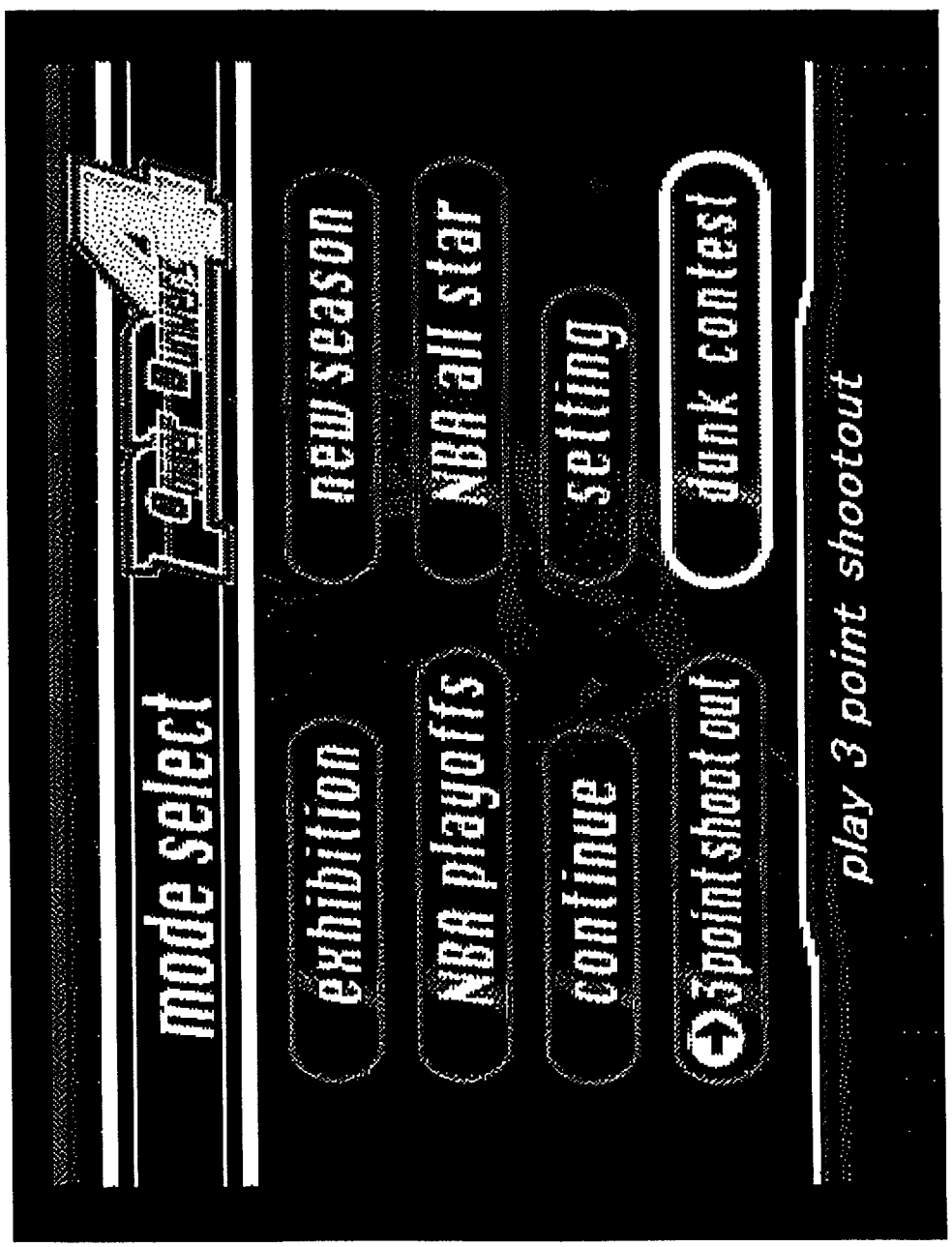
FIG. 4 is a view for use in describing a start image or scene of a three-point shootout game according to this invention.

At first, it is noted that the basketball game according to this invention will be executed in accordance with a flow chart illustrated in FIG. 3. Herein, let the storage medium 84 which may be a CD-ROM and which stores a program of the basketball game be set into the storage medium driver 81 illustrated in FIG. 1 and the game device be powered. Under the circumstances, the basketball game is started. As shown in FIG. 3, the game device is initialized at a step S1 and at least part of the program is transferred from the storage medium 84 to the main memory 53. In this state, a mode selection image or scene, as shown in FIG. 4, is displayed as an initial image on the display device 65. As readily understood from FIG. 4, the mode selection scene indicates eight modes which can be selected by the user. This shows that the program according to this invention prepares eight selectable modes. Specifically, the eight selectable modes are composed of an exhibition mode, a new season mode, an NBA playoff mode, an NBA all star mode, a continue mode, a setting mode, a three-point shootout mode, and a dunk contest mode, as illustrated in FIGS. 3 and 4. The mode selection scene shown in FIG. 4 is being continuously displayed until any one of the modes is selected by the user, as readily understood from a step S3 in FIG. 3.

Inasmuch as this invention relates to the three-point shootout, it is assumed in FIG. 4 that the three-point shootout mode is selected by a cursor which is represented by an arrow directed rightwards. Herein, the new season mode, the NBA playoff mode, and the NBA all star mode are executed on the basis of a normal rule and may be called a primary basketball game or a usual basketball game.

At the step S3 in FIG. 3, let the three-point shootout mode be selected by the user on the mode selection scene illustrated in FIG. 4. In this event, the main memory 53 is loaded with a part of the program from the storage memory driver 81 (FIG. 1) through the decoder 82 to execute the three-point shootout game. After the three-point shootout game is over, the processing is returned back to the selection mode scene (step S2), as shown by the encircled number 1 in FIG. 3. In addition, after each of the other modes illustrated in FIG. 3 is selected and executed, the mode selection scene (FIG. 4) is also displayed on the display device 65.

Figure 5:
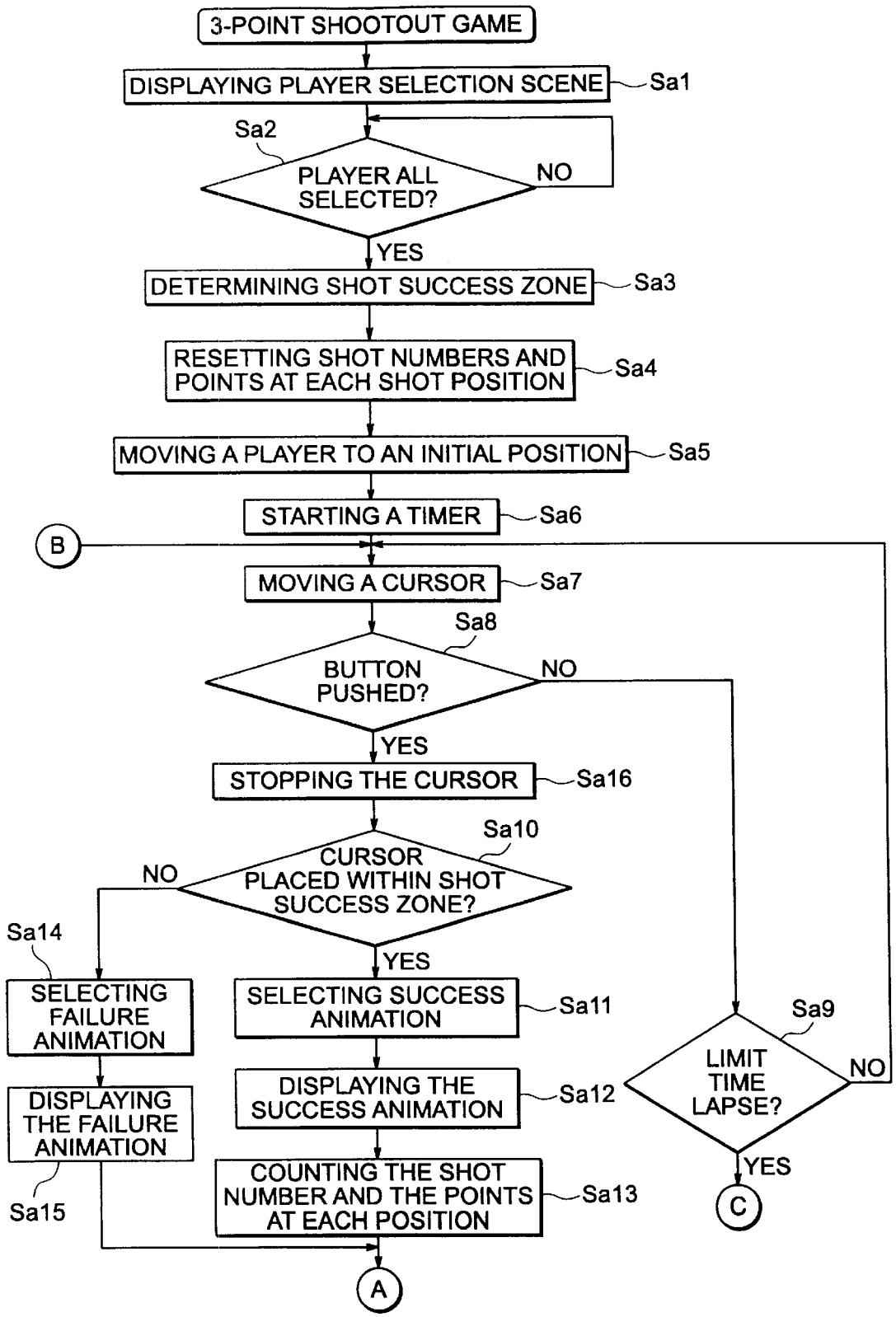
FIG. 5 is a flow chart for use in describing operations carried out in the three-point shootout game according to this invention.
Figure 6:
FIG. 6 shows a player selection image or scene of a player selection step illustrated in FIG. 5.

Referring to FIG. 5, exemplification is made about the program part which executes the three-point shootout game. As mentioned before, the three-point shootout game is started by selecting the three-point shootout mode on the mode selection scene by the user. In the three-point shootout game, processing is carried out at a step Sa1 in FIG. 5 to display, on the display device 65a, a player selection scene or image as illustrated in FIG. 6. On the player selection scene, the user can select a team belonging to the NBA and a player or players. Such players may be referred to as characters in the three-point shootout game.

By using the player selection scene, the user or users can assign either one of marks "CPU", "P1", "P2", or "OFF" to all of eight players displayed on the player selection scene. Herein, it is to be noted that the mark "CPU" represents that a computer in the game device becomes an opponent while the mark "P1" and "P2" represent users (namely, game players) 1 and 2, respectively. In addition, the mark "OFF" represents that no selection is made about the corresponding player. The marks "P1" and "P2" may be assigned to a plurality of the players displayed on the player selection scene. As readily understood from the above, the three-point shootout game is played by two of the users or the game players when both the marks "P1" and "P2" are selected on the player selection scene.

The player selection scene or image illustrated in FIG. 6 displays, as the name of the team, "Charlotte Hornets" and, as the names of the players, "T. Knights", "T. Murray", "S. Barrel", "M. Sielie", "S. Mitchell", "R. Car", "D. Ellis", "J. Williams", "D. Wesley", "B. Phills", "G. Rice", "R. Mason", and "V. Divatz". In the illustrated example, the user selects "T. Knights" as the player in the three-point shootout game, as designated by "P1" in FIG. 6, and also assigns the remaining seven players of "T. Murray", "S. Barrel", M. Sielie, S. Mitchell, R. Car, D. Ellis, and J. Williams to the computer, as designated by "CPU". In the illustrated example, the players "D. Wesley", "B. Phills", "G. Rice", "R. Mason", and "V. Divatz" are reserved to be selected by the user. At any rate, it is noted that eight players can be selected at maximum in the example when no "OFF" is indicated on the player selection scene.

In the state illustrated in FIG. 6, an elimination tournament is executed from a first round to a final or third round among eight players. Alternatively, when six players are set into "OFF" states, one round alone is executed between two players. This state is similar to the final round or third round and has a highest degree of difficulty, as will become clear later in detail.

Thus, the number of the rounds in the tournament can be varied in accordance with the number of the players participating in the three-point shootout game and the degree of difficulty is also varied in accordance with the round number. More specifically, the degree of difficulty in the three-point shootout game can be determined by a width of a shot success zone, as will be described later, and the width of the shot success zone becomes narrow as the elimination tournament becomes close to the final round. In the illustrated example, the width of the shot success zone is defined by the number of bars, as will become clear later, and the bars becomes small in number with an increase of the degree of difficulty. Definitely, the degree of difficulty is highest in the final round and specified by a single bar.

In the illustrated three-point shootout game, the number of the rounds in the tournament is varied with the number of the players or characters participating in the tournament and brings about the degree of difficulty by varying the number of the bars which define the shot success zone. Furthermore, the players played under control of the CPU or the computer become strong as the round number proceeds and they make a high score in the three-point shootout game. Thus, it is understood in the illustrated example that the degree of difficulty is controlled by strength of each player controlled by the CPU.

In FIG. 6, only one player, namely, "T. Knight" is selected by the user while the remaining seven players are controlled by the CPU, as mentioned before.

Referring back to FIG. 5, the CPU 51 judges at a step Sa2 whether or not the players are all selected by the user. When all the players are selected by the user, the step Sa2 is followed by a step Sa3 at which the width of the shot success zone is determined by the CPU 51 in accordance with the number of the rounds. For example, when the first round is played, the width of the shot success zone becomes maximum and the resultant degree of difficulty is lowest. In the second round, the shot success zone has a width narrower than that in the first round. In the third or final round, the shot success zone has the narrowest width and a highest degree of difficulty.

As mentioned above, it should be noted that the three-point shootout game according to this invention determines whether or not each shot is successful, in consideration of a relationship between the movable cursor and the shot success zone. Specifically, when the user pushes a predetermined button which may be either one of the first through the fourth buttons 93c to 93f while the movable cursor is moving within the shot success zone, the CPU 51 judges that the shot is successful. On the other hand, when the movable cursor is located outside of the shot success zone at the time the predetermined button is pushed by the user, it is judged that the shot is unsuccessful.

From this fact, it is readily understood that success or failure of each shot is decided in this invention with reference to manipulation timing at which the user pushes the predetermined button. In other words, the success or the failure of each shot is determined in timed relation to the manipulation timing. This means that the manipulation of the button necessary for the three-point shootout game is simplified in this invention. Nevertheless, it is possible to keep up interest of the user because the degree of difficulty can be varied by changing a moving speed of the cursor and by narrowing the shot success zone.

Figure 7:
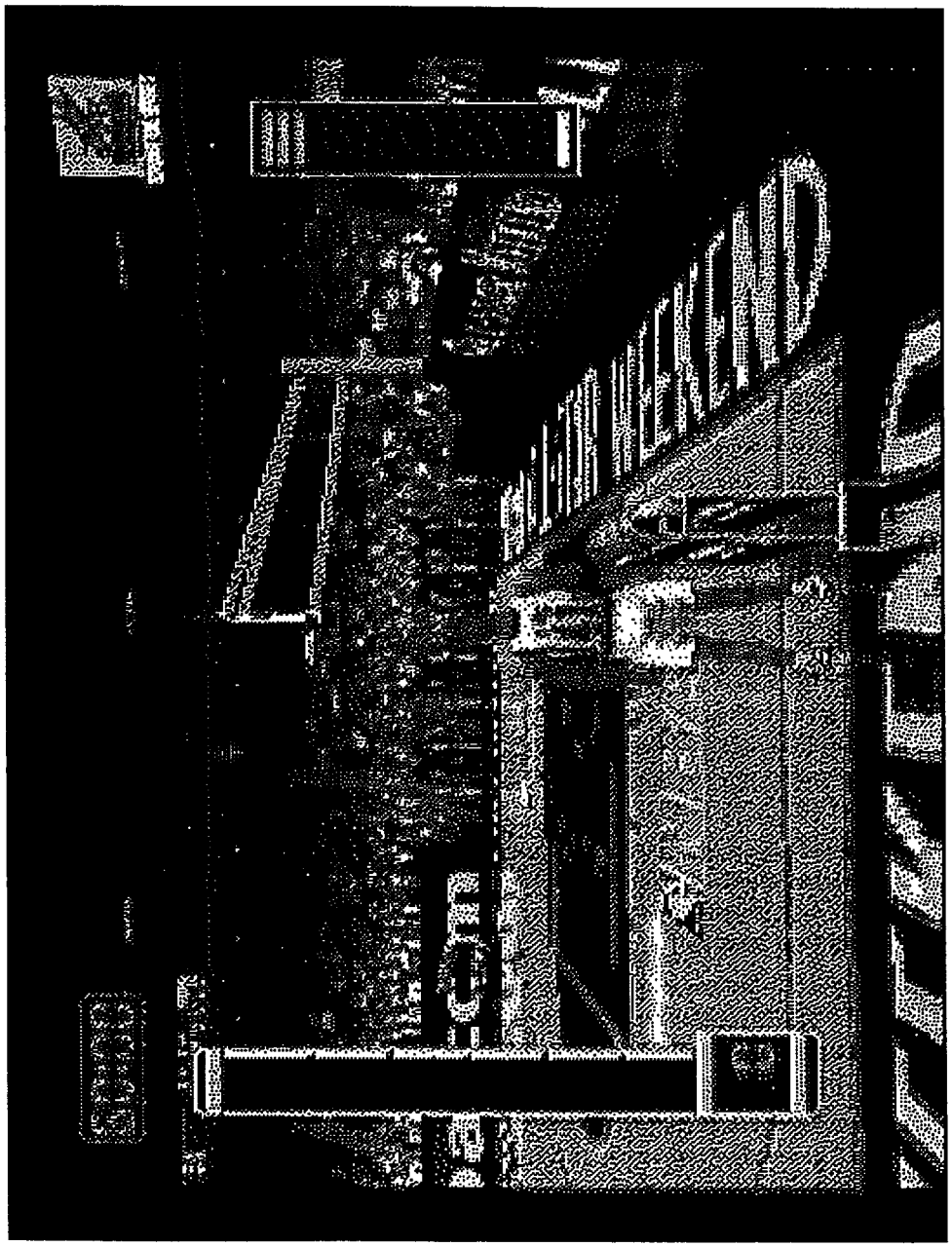
FIG. 7 shows a start scene of the three-point shootout game according to this invention.

Referring to FIG. 7, a start scene of the three-point shootout game is illustrated which displays, on the right hand side thereof, a gauge which determines whether or not the shot succeeds.

Figure 8:
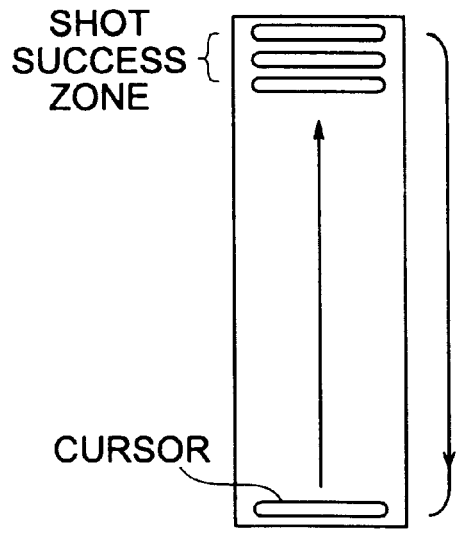
FIG. 8 shows a schematic view for use in describing a gauge illustrated in FIG. 7 in detail.

Referring to FIG. 8 together with FIG. 7, the gauge has a shot success zone located at a top portion thereof and formed by three bars in the illustrated example. On the other hand, the cursor of a bar shape is shown at the bottom of the gauge. In the illustrated example, the cursor is moved from the bottom of the gauge towards the top at the predetermined speed and is returned back to the bottom after it reaches the uppermost portion of the gauge or is stopped in response to the input manipulation of the user. The cursor executes this movement for a prescribed duration.

In the example illustrated in FIGS. 7 and 8, the first round is shown which is specified by the shot success zone of three bars and which has a widest width. This shows that the gauge illustrated in FIGS. 7 and 8 exemplifies the lowest degree of difficulty.

As shown at the step Sa3 in FIG. 5, the degree of difficulty is varied to change the number of the bars and, specifically, is raised up by reducing the number of the bars in the shot success zone to two or one. As a result, the width of the shot success zone can be changed in accordance with the degree of difficulty.

In FIG. 5, when the width of the shot success zone is determined at the step Sa3 by the number of the bars to specify the round number, the step Sa3 proceeds to a step Sa4 at which an additional gauge is reset into an initial state to cancel previous player's scores, namely, the number of successful shots of the previous player, points obtained at each shot position, and the like.

Figure 9:
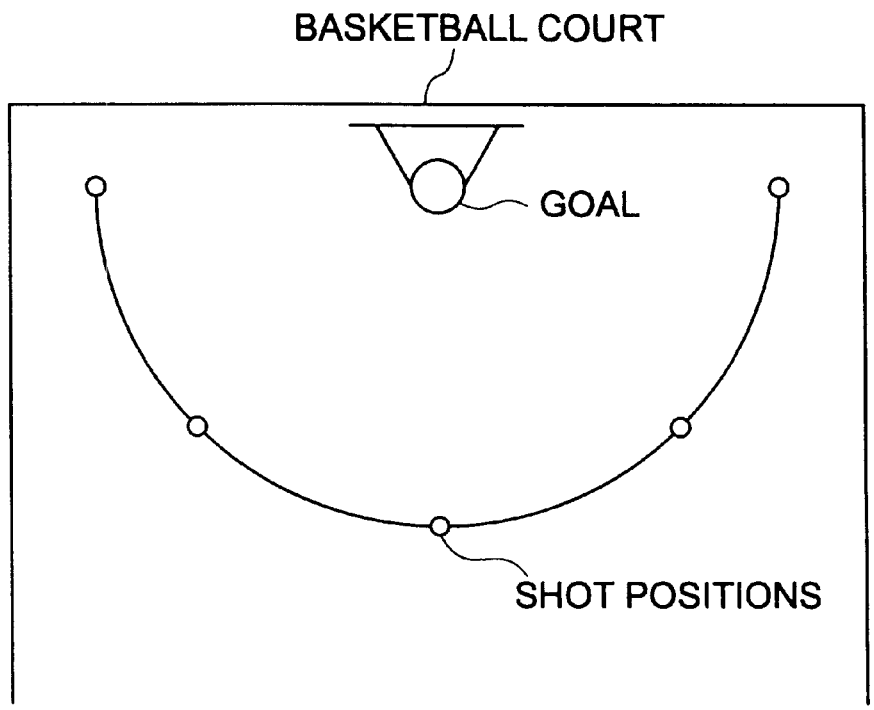
FIG. 9 is a view for use in describing a real three-point shootout executed in the NBA.

Referring to FIG. 9, description will be simply made about rules of the real three-point shootout executed in the NBA for a better understanding of this invention. In the real three-point shootout, five shot positions are determined outside of a three-point line drawn on a court. Each player shoots a ball at a goal or basket at each of the five shot positions and the number of successful shots is scored at each player. Consequently, competition is made about the successful shots in the three-point shootout.

More specifically, first through fourth successful ones of the five shots are counted up as one point at each shot position while a fifth or last successful shot is counted as two points at every shot position. When all of the twenty-five shots at the five shot positions are successful, thirty points are given to the player.

Turning back to FIG. 5, the step Sa4 is followed by a step Sa5 when the reset operation is finished at the step Sa4. At the step Sa5, the player in this game moves to an initial one of the shot positions, as illustrated in FIG. 7. At this time, a timer is started to put the additional gauge illustrated on the left side of FIG. 7 into an active state (step Sa6). In the example shown in FIG. 7, the additional gauge has an upper gauge for displaying the points due to the successful shots of the displayed player in the form of the number of bars and a lower gauge for displaying the points due to the successful shots in the form of the number. Over the upper gauge, a timer is located to display a remaining time. In the illustrated example, sixty seconds are displayed on the timer as the remaining time.

At the step Sa6 shown in FIG. 5, when a limit time of sixty seconds is started to be clocked by the timer, the cursor displayed on the right side of FIG. 7 is moved upwards at the predetermined speed, as shown in FIG. 8 (step Sa7). Subsequently, judgement is made at a step Sa8 about whether or not the user pushes the predetermined button. When the user does not push the predetermined button, the step Sa8 is followed by a step Sa9 at which detection is made about whether or not the limit time lapse. As long as the limit time does not lapse, the steps Sa8 and Sa9 are repeated.

When the predetermined button is pushed at the step Sa8, movement of the cursor is stopped at a step Sa16. Thereafter, judgement is made by the CPU 51 about whether or not the cursor is placed within the shot success zone (step Sa10). When the cursor is placed within the shot success zone, the step Sa10 is succeeded by a step Sa11 at which an animation is selected which represents success of the shot and which is displayed at a step Sa12. Thereafter, the successful shots are counted up at a step Sa13 and the points are added at every shot position.

Figure 10:
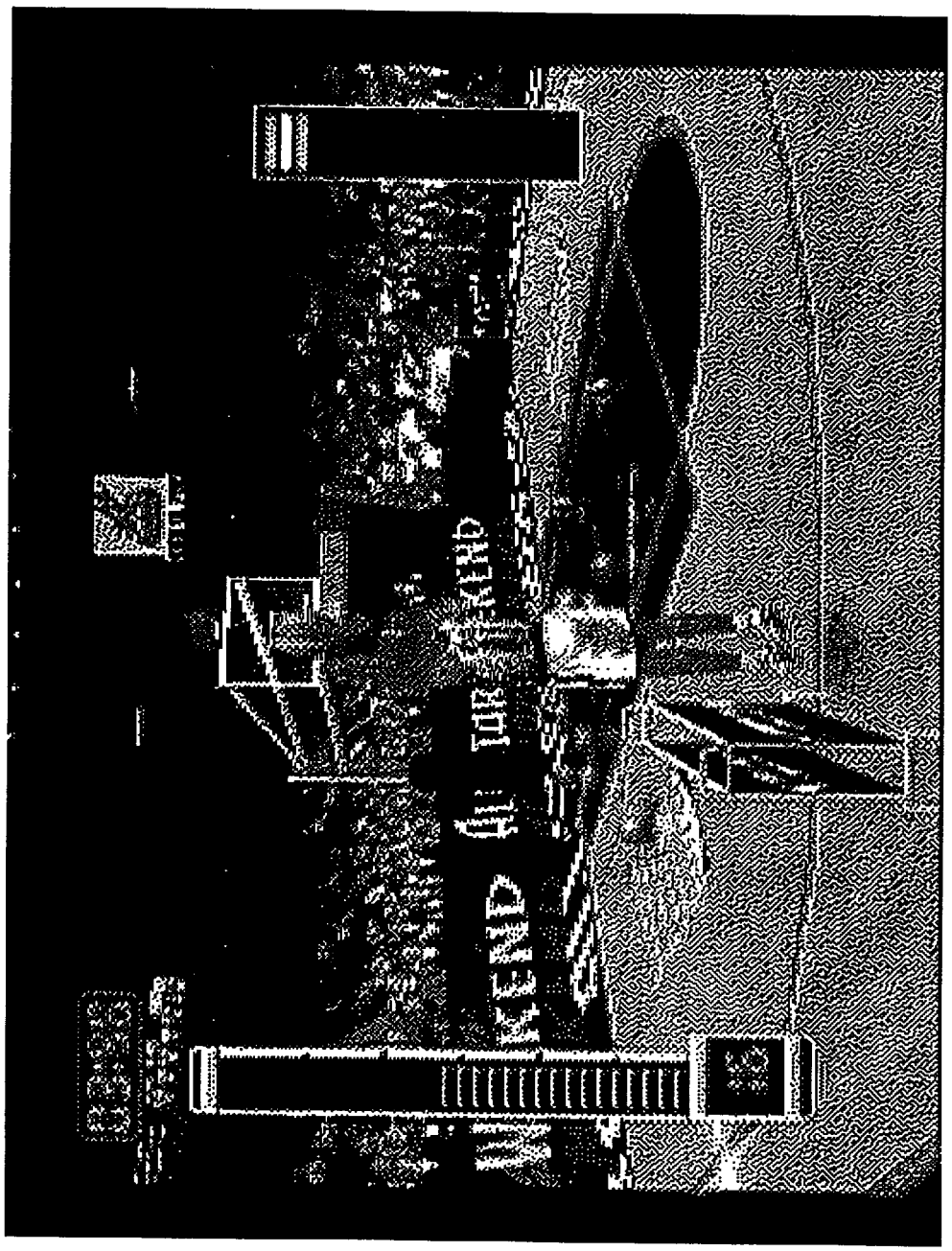
FIG. 10 shows a game scene of the three-point shootout game according to this invention in connection with FIG. 5.

Temporarily referring to FIG. 10, an image is exemplified which displays a successful shot because the cursor is stopped within the shot success zone. This means that the predetermined button is pushed by the user when the cursor is positioned within the shot success zone. In this case, the animation which represents the success of the shot is displayed on the display device 65, as shown in FIG. 10. In addition, FIG. 10 shows that the scores of the illustrated player become equal to 16 while the remaining time is shorter than four seconds.

On the other hand, when it is judged at the step Sa10 that the cursor is not positioned within the shot success zone, the step Sa10 is followed by a step Sa14 at which selection is made about a failure animation which displays failure of the shot. The step Sa14 is succeeded by a step Sa15 at which the failure animation is displayed on the display device 65.

Figure 11:
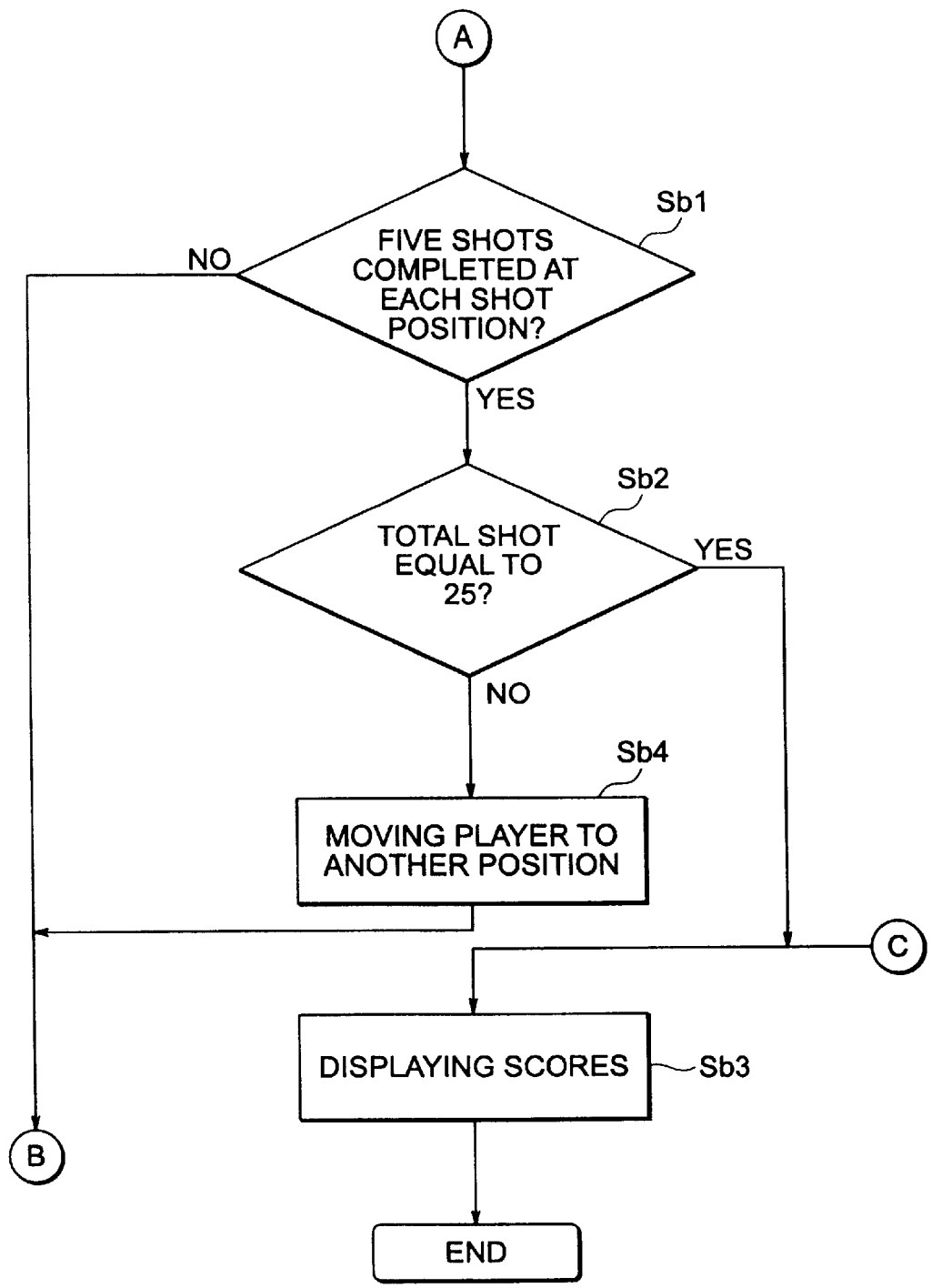
FIG. 11 is a flow chart for use in describing an operation carried out after the operation illustrated in conjunction with FIGS. 5; 10.

After execution of the step Sa13 for counting the points or the step Sa15 for displaying the failure animation, a step Sb1 illustrated in FIG. 11 is executed through a point A illustrated in FIGS. 10 and 11. At the step Sb1, judgement is made about whether or not five shots are thrown or completed at each shot position. When it is judged at the step Sb1 that the five shots are completed at each shot position, a step Sb2 is executed to detect whether or not a total number of the shots reaches twenty-five. If the total number of the shots is equal to twenty-five, the scores of the player in question are displayed together with the number of the shots at every one of individual shot positions (step Sb3) and, thereafter, processing is finished.

When the total number of the shots does not reach twenty-five, the step Sb2 is followed by a step Sb4 at which the player is moved to another shot position and which is returned back to the step Sa7 (FIG. 5) through a point B shown in FIG. 11. Thereafter, processing is executed in connection with the three-point shoot in the manner mentioned above.

Figure 12:
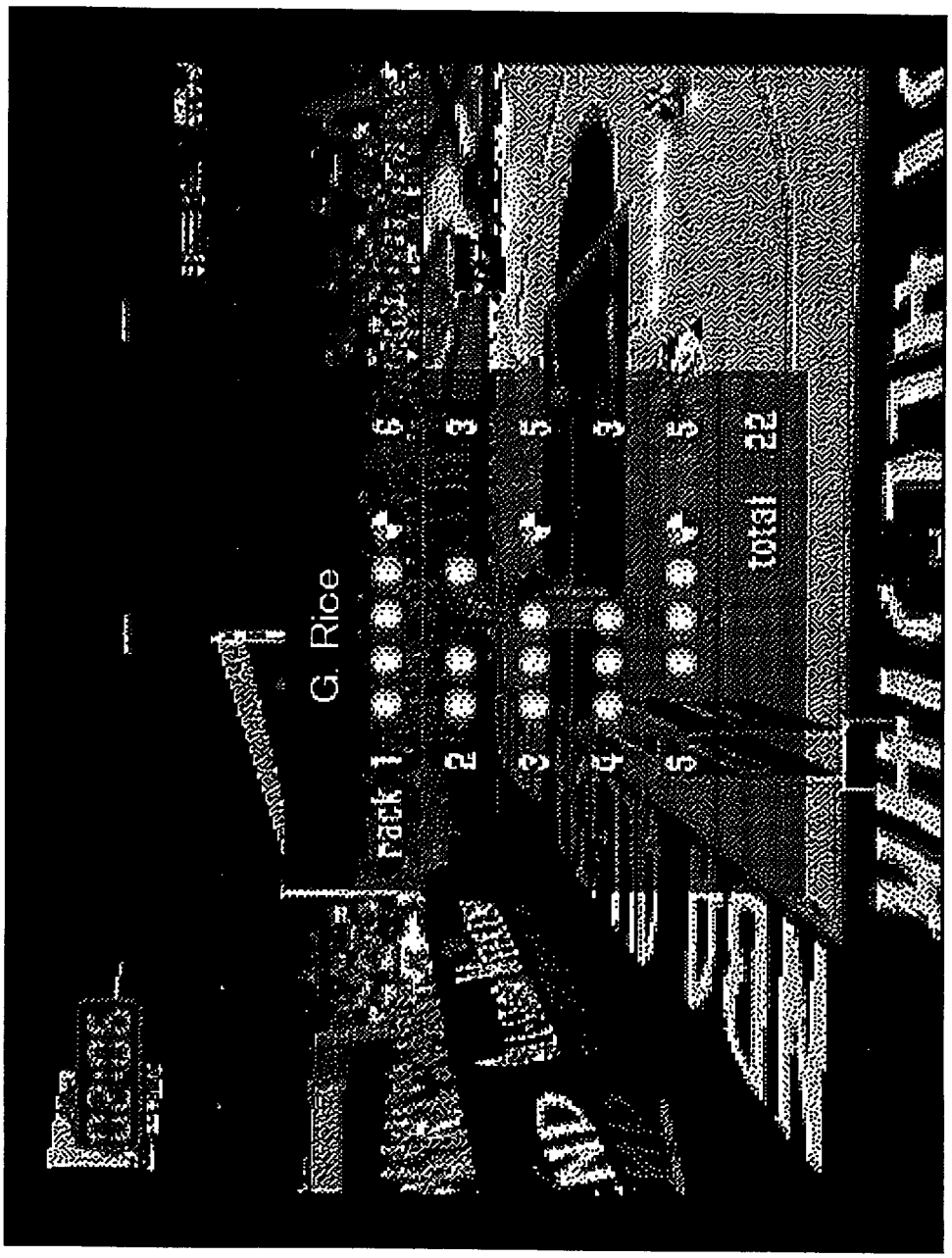
FIG. 12 shows a scene of an end of the three-point shootout game according to this invention.

Referring to FIG. 12, illustration is made about a score display scene of displaying the scores of the player, C. Rice obtained at the first through the fifth ones 1, 2, 3, 4, and 5 of the shot positions or racks. In FIG. 12, successful shots at each rack are displayed along with the shot number and the points. Since two points are given to the last shot at each shot position, as mentioned before, it is readily understood from FIG. 12 that the successful shots of the player, C. Rice, are equal in number to nineteen and equal in score to twenty-two points.

Referring back to FIG. 5, when the limit time of, for example, sixty seconds lapses at the step Sa9, the step Sb3 (FIG. 11) follows the step Sa9 through the point C to display the scores in a manner similar to that mentioned before. Thus, the three-point shootout game is finished.

As readily understood from the above, this invention determines success or failure of each shot in the basketball game in consideration of a timing relationship between a position of the movable cursor and the manipulation timing of each user, instead of manipulating the analog stick. With this method, it is possible to contest success or failure of the shot by a simple manipulation. In other words, this invention successively varies images with time on the display device and determines success or failure of each shot by a particular scene or image appearing at a specific time. Taking the above into consideration, the game device according to this invention visually displays desired or successful timing on the display device and judges whether or not the manipulation timing of each user is coincident with the desired timing, to determine the success or the failure of each shot.

As mentioned in the example, description has been made only about the three-point shootout game which has the lowest degree of difficulty specified by three bars. The three-point shootout game of the lowest degree of difficulty may be played as the first round and may be thereafter followed by the second round of two bars succeeded by the final round or a tiebreak of a single bar. In consequence, the degree of difficulty in the three-point shootout game can be changed by the number of the bars included in the shot success zone. Herein, the operations described in conjunction with FIGS. 3, 5, and 11 can be accomplished by putting the CPU 51 into an active state on the basis of instructions issued from the user, by processing the program loaded in the main memory 53 by the CPU 51, and by controlling the graphic controller 60 on the basis of results of processing. This shows that the CPU 51 and the graphic controller 60 are operable as a co-processor which serves to display the three-point shootout game on the display device 65 and may be therefore called an image display device or system for displaying the three-point shootout game. In this event, the graphic controller 60 is operated to display, on the display device 65, the basketball court and a player along with the gauge which has the shot success zone and the movable cursor. On the other hand, the CPU 51 is operated to judge whether or not the cursor is stopped within the shot success zone and to determine success or failure of each shot.

In addition, the program which defines the operations illustrated in FIGS. 3, 5, and 11 is stored in the storage medium 84 and is delivered to the main memory 53 in accordance with the user's instruction, as well known in the art. While this invention has thus far been described in conjunction with a few embodiments thereof, it will readily be possible for those skilled in the art to put this invention into practice in various other manners. For example, although the above-mentioned description has been restricted to the three-point shootout game alone, this invention may be applied to determine either success or failure of a shot in a usual basketball game or in the dunk contest game. Moreover, it is possible to determine success or failure of each shot in consideration of ability or an attribute of a player selected by the user. For example, the moving speed of the cursor may be changed in accordance with the attribute of the selected player. In addition, not only the width of the shot success zone but also the moving speed of the cursor may be varied in accordance with the degree of difficulty. Finally, the three-point shootout game has been realized as a mini game in the basketball game, as readily understood from FIG. 3 and is helpful to make the whole of the basketball game interesting.

What is claimed is:

1. A method of displaying an image on a display device to play a game of basketball in the form of a video basketball game in response to an operation of a video game player, comprising the steps of:

displaying, on the display device, a shot image of taking a shot at a goal by a character selected in the video basketball game;

displaying, on the display device, a gauge which is extended from one end to another end and which has a shot success zone, a shot failure zone, and a movable cursor movable from one end to another end of the gauge;

moving the movable cursor within the gauge from one end to another end at a predetermined speed;

stopping the movable cursor in response to the operation of the video game player;

judging whether or not the movable cursor is stopped in the shot success zone to determine success or failure of the shot;

visibly displaying a timer gauge on the display device to represent a shooting time which varies with time; and measuring the shooting time whether or not a predetermined time lapses;

the shot success zone having a width determined by bars which are displayed in the gauge and which are varied in number in accordance with a degree of difficulty of the video basketball game.

2. A method as claimed in claim 1, further comprising the step of:

visibly displaying a shot number gauge for displaying the number of the success shots.

3. A method as claimed in claim 1, wherein the video basketball game is for playing a three-point shootout on the display device.

4. A method as claimed in claim 3, further comprising the step of:

displaying a three-point line and the goal determined by the rules of basketball, together with the character which moves as a player in the video basketball game.

5. A method as claimed in claim 4, wherein the step of displaying the shot image comprises the step of displaying the shot image such that the character takes shots at the goal at a plurality of positions determined along the three-point line.

6. A method as claimed in claim 5, wherein the step of displaying the shot image comprises the step of displaying a selection image for selecting the character.

7. An image display device for use in displaying an image on a display device to play a game of basketball in the form of a video basketball game in response to an operation of a video game player, comprising:

displaying means for displaying, on the display device, a shot image of taking a shot at a goal by a character selected in the video basketball game;

gauge display means for displaying, on the display device, a gauge which is extended from one end to another end and which has a shot success zone, a shot failure zone, and a movable cursor movable from one end to another end within the gauge;

timer gauge display means for visibly displaying a timer gauge on the display device to represent a shooting time which varies with time cursor moving means for moving the movable cursor from one end to another end at a predetermined speed;

stopping means for stopping the movable cursor in response to operation of the video game player;

judging means for judging whether or not the movable cursor is stopped in the shot success zone to determine success or failure of the shot;

deciding means for deciding success of the shot when the stopped position of the cursor is present in the shot success zone, to thereby determine the success or the failure of the shot by the operation timing;

the shot success zone having a width determined by bars which are displayed in the gauge and which are varied in number in accordance with a degree of difficulty of the video basketball game.

8. An image display device as claimed in claim 7, further comprising:

means for visibly displaying a shot number gauge for displaying the number of the success shots.

9. An image display device as claimed in claim 7, further comprising:

means for displaying a three-point line and the goal determined by the rules of basketball, together with the character which moves as a player in the video basketball game.

10. An image display device as claimed in claim 9, wherein the displaying means comprises:

means for displaying the shot image such that the character takes shots at the goal at a plurality of positions determined along the three-point line.

11. An image display device as claimed in claim 10, wherein the displaying means comprises means for displaying a selection image for selecting the character.

12. A game machine for use in playing a game of basketball in the form of a video basketball game in response to an operation of a video game player by the use of a display device, comprising:

display means for providing, on the display device, displays of a gauge which has a shot success zone and a movable cursor, together with a character which operates as a basketball player in the video basketball game and which takes a shot at a goal;

cursor control means for moving the movable cursor in a direction of the shot success zone within the gauge to stop the cursor in response to operation timing of the video game player; and judging means for judging whether or not the cursor is stopped within the shot success zone, to detect success of the shot when the cursor is stopped within the shot success zone and, otherwise, to detect failure of the shot; and gauge control means for controlling a width of the shot success zone in accordance with a degree of difficulty selected by the video game player;

the shot success zone having a width determined by bars which are displayed in the gauge and which are varied in number in accordance with a degree of difficulty of the video basketball game.

13. A game machine as claimed in claim 12, wherein the video basketball game simulates the three-point shootout.

14. A computer-readable storage medium for storing a program which plays a game of basketball in the form of a video basketball game in response to an operation of a video game player by the use of a display device, the program comprising the steps of:

displaying, on the display device, a shot image of taking a shot at a goal by a character selected in the video basketball game;

displaying, on the display device, a gauge which is extended from one end to another end and which has a shot success zone, a shot failure zone, and a movable cursor movable from one end to another end of the gauge;

moving the movable cursor within the gauge from one end to another end at a predetermined speed;

stopping the movable cursor in response to the operation of the video game player; judging whether or not the movable cursor is stopped in the shot success zone to determine success or failure of the shot;

visibly displaying a timer gauge on the display device to represent a shooting time which varies with time; and measuring the shooting time whether or not a predetermined time lapses;

the shot success zone having a width determined by bars which are displayed in the gauge and which are varied in number in accordance with a degree of difficulty of the video basketball game.

15. A computer-readable storage medium as claimed in claim 14, wherein the step of successively varying the display situations comprises the step of:

visibly displaying a shot number gauge for displaying the number of the success shots.

16. A computer-readable storage medium as claimed in claim 15, wherein the video basketball game is for playing a three-point shootout on the display device.

17. A computer-readable storage medium as claimed in claim 16, further comprising the step of:

displaying a three-point line and the goal determined by the rules of basketball, together with the character which moves as a player in the video basketball game.

18. A computer-readable storage medium as claimed in claim 17, wherein the step of displaying the shot image comprises the step of displaying the shot image such that the character takes shots at the goal at a plurality of positions determined along the three-point line.

19. A computer-readable storage medium as claimed in claim 18, wherein the step of displaying the shot image comprises the step of displaying a selection image for selecting the character.

\* \* \* \* \*